L. D. CHEMIOUX.
Cooked Corn-Beef.
No. 153,046. Patented July 14, 1874.
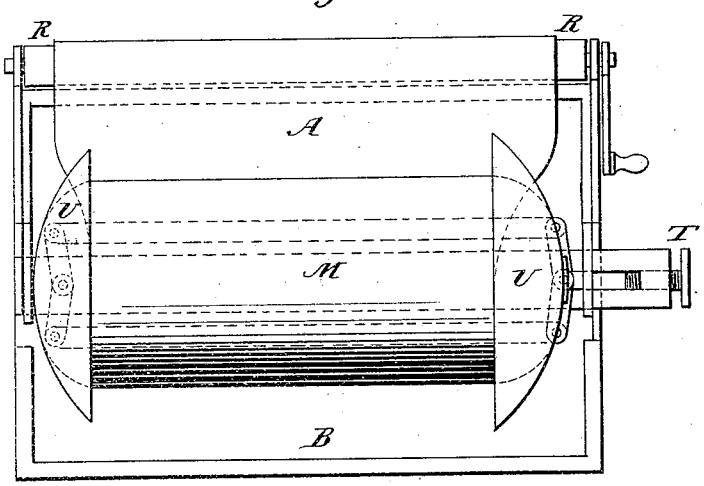
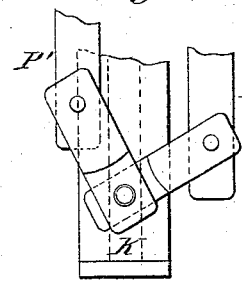
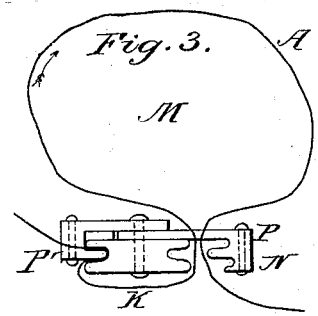
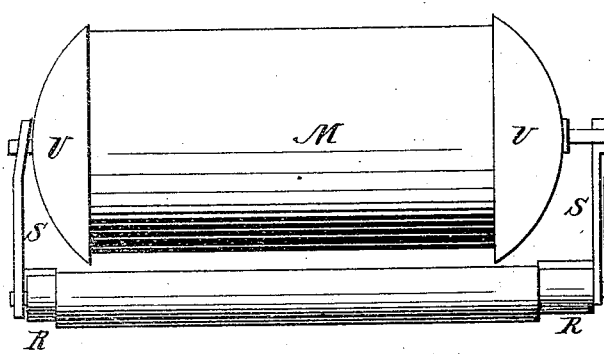
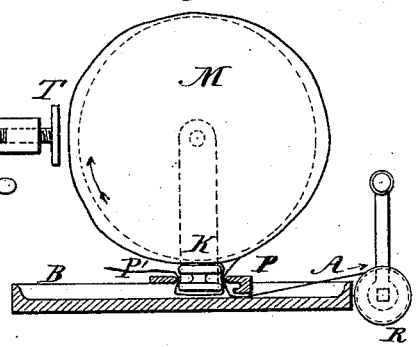
Witnesses.
Inventor:
Louis Désiré Chemioux.

UNITED STATES PATENT OFFICE

LOUIS D. CHEMIOUX, OF CHICAGO, ILLINOIS.

IMPROVEMENT IN COOKED CORN-BEEF.

Specification forming part of Letters Patent No. 153,046, dated July 14, 1874; application filed July 9, 1873.

*To all whom it may concern:*

Be it known that I, LOUIS DÉSIRÉ CHEMIOUX, of Chicago, Cook county, Illinois, have invented a new Method of Preserving and Pressing Beef and other meats, of which the following is a specification:

Take suitable pieces of beef or other meat, rub them with dry salt, and place them in barrels in alternate layers of meat, salt, and brown sugar, intermixed with aromatic herbs, such as bay-tree leaves, thyme, and juniper-berry. Leave in the barrels for twenty-four hours in this dry salt; then fill the barrels with salt-brine containing saleratus. Let the meat remain in this brine for about twelve to fifteen days, according to the nature of the meat. The above comprises the salting and curing process.

For cooking and preserving the meat, proceed as follows: Prepare with beef-bones an aromatic broth, (*bouillon.*) Keep it boiling a sufficient length of time to obtain the proper strength and thickness. In this broth put carrots, celery, turnips, leeks, parsley, whole pepper, spices, and a very fine powder of charcoal. The meat is now placed, in layers, into strong wire baskets, and is lowered into the aromatic broth or *bouillon* by means of pulleys and ropes. As soon as the bones can readily be detached from the meat it is considered sufficiently cooked and is withdrawn.

The meat is now rolled and pressed with the following press:

Figure 1 represents the plan, Fig. 4 a longitudinal view, and Fig. 5 a vertical view, of the press. Fig. 2 represents the plan, and Fig. 3 the vertical section, of the parallel rules used for fastening the wrapping material.

B represents the platform or bed, upon which the press or rolling apparatus is established. R is a roller on one end of the platform, upon which the covering cloth or wrapper is unrolled by means of its crank. S S are two standards, attached to platform B by one end, and carrying on the other end each a semicircular metallic piece, U, one of which pieces U may be brought forward and backward against or from the meat by means of screw T. If found necessary a screw may be put on each standard instead of one alone. A is the wrapping material, which may be made of a roll or sheet of perforated and ornamented metal, paper, linen, cotton, or other suitable cloth. P and P' are two parallel rules fastened upon the piece K, and capable of being pushed in or out of the recesses on said piece K. K is a piece of wood or metal fastened to the platform B lengthwise having a recess, each side of which, when pushed in, the parallel rules P P' fit sufficiently tight to fasten the wrapping material A. N is a knife-blade fastened upon and under rule P, which cuts the wrapping material when the latter is pushed into the recess on K opposite to it. M represents the roll of meat.

The operation of this press is as follows: The meat after being duly cooked is laid lengthwise upon the wrapping material or envelope A, so that when it is rolled, pressed, and cut up for use, the sinews and muscles will be cut across. This wrapping material is now made to pass under the parallel rule P and around the meat, then over the piece K, then under and around it, then over the parallel rule P', which rule is then pushed into the recess opposite. (Shown on piece K.) The sheet A is now rolled upon the roller R by means of the crank attached to it, thereby drawing it tightly around the meat. Parallel rule P is now pushed into the recess opposite to it upon piece K, thereby fastening this end of the wrapper A. The two ends are now glued together, and, by means of the knife N, the wrapper is separated. The two semicircular-shaped pieces of metal U U, mounted upon the standards S S, are now pressed against the ends of the roll of meat by means of the screw T, or its equivalent. The roll being now pressed properly and in its peculiar shape, it is now allowed to cool a sufficient length of time, when it is dipped into a preserving-mixture of beef-grease and a very fine charcoal-powder, serving as an air-tight protection. The meat is now put on ice, and when taken out is wrapped in an envelope made of loose and open cloth, which has been dipped in gum as a further protection against decay. A sheet of tin-foil is now wrapped around the roll, thus completing the operation.

It will be seen from the preceding description that my mode of preparing beef and other meats differs essentially from the ordinary corned-beef.

In my salting and curing process the aromatic herbs I use impart to the meat a flavor superior to that of ordinary corned-beef.

In the usual way of cooking corned-beef the juices of the meat, and the gelatine contained in the bones, are to a great extent lost by remaining in the broth.

With my prepared thickened aromatic broth I am enabled to preserve all the juices, as the broth is made sufficiently thick to retain them. The bones furnish the gelatine. The vegetables and spices added impart a very rich and pleasant flavor to the meat. The fine charcoal-powder penetrates into the pores of the meat, and absorbs all gases having a tendency to decay it. The gelatine contained in the *bouillon* or broth closes up the pores of the meat, and thereby prevents the escape of its juices or the introduction of air, adding also to its nourishing qualities.

The peculiar manner in which I roll and press the meat without bones—viz., laying the pieces lengthwise—makes it more palatable, as, by cutting it for use, the grain of the meat, its sinews, and muscles are cut across.

My preserving mixture of beef-grease and charcoal-powder, and the envelope made of cloth covered with gum, (all of these processes differ essentially from the usual way of preparing corned-beef,) produce an article of diet much superior to the corned-beef as usually made.

What I claim as my invention is—

1. The combination of the dry salt, brown sugar, aromatic herbs, such as bay-tree leaves, thyme, and juniper-berry, with salt-brine, containing saleratus, used for curing meat, substantially as herein described.

2. An aromatic broth or *bouillon* composed of beef-bones, carrots, celery, turnips, leeks, parsley, whole pepper, spices, and a very fine charcoal-powder, the whole used for cooking the meat in, substantially as herein described.

3. The improved press consisting of platform B, roller R with a crank, standards S S, semicircular metallic pieces U U, parallel rules P and P', the recessed piece K, the knife N, and screw T, the whole constructed and operated substantially as herein described.

4. A mixture of beef-grease and fine charcoal-powder used as a preserving covering, substantially as herein described.

5. The wrapping material, made of perforated metal, paper, or linen, cotton, or other equivalent cloth, used for wrapping and compressing the meat, and also the last or outside covering, made of loose and open cloth dipped in gum, substantially as herein described.

6. The combination of the following processes in preparing corned-beef and other meats, viz: First, the curing process with salt, brown sugar, aromatic herbs, such as bay-leaves, thyme, juniper-berry, salt-brine, and and saleratus; second, the aromatic broth of beef-bones, carrots, celery, turnips, leeks, parsley, whole pepper, spices, and charcoal-powder; third, the improved press for rolling and compressing the meat; fourth, the mixture of beef-grease and charcoal-powder; fifth, the wrapper, made of perforated metal, paper, linen, cotton, or other cloth, and also the outside wrapper, made of loose and open cloth dipped in gum; the whole used as a continuous process for preserving meat, substantially as herein described.

7. As a new article of manufacture, meat cured, cooked, rolled, pressed, covered, preserved, and put up in the shape and according to the process, substantially as herein described.

LOUIS DÉSIRÉ CHEMIOUX.

Witnesses:
 N. B. BOYDEN,
 JNO. P. COLNÉ, Jr.